United States Patent [19]
Boehme

[11] Patent Number: 5,738,384
[45] Date of Patent: Apr. 14, 1998

[54] TUBE CONNECTION SECURING CLIP

[75] Inventor: Dietmar Boehme, Duisburg, Germany

[73] Assignee: Ford Global Technologies, Inc., Dearborn, Mich.

[21] Appl. No.: 660,365

[22] Filed: Jun. 7, 1996

[30]     Foreign Application Priority Data

Apr. 7, 1995 [DE] Germany ............... 195 13 158.8

[51] Int. Cl.$^6$ .................................................. F16L 21/06
[52] U.S. Cl. ...................... 285/114; 285/419; 285/470; 285/373
[58] Field of Search ........................ 285/114, 419, 285/420, 373

[56]          References Cited

U.S. PATENT DOCUMENTS

| | | | |
|---|---|---|---|
| 2,457,796 | 12/1948 | White . | |
| 2,721,050 | 10/1955 | Sams . | |
| 3,252,192 | 5/1966 | Smith | 285/114 |
| 3,881,753 | 5/1975 | Bochory | 285/114 |
| 4,093,282 | 6/1978 | Kyriakodis | 285/114 |
| 4,261,600 | 4/1981 | Cassel | 285/419 |
| 4,423,892 | 1/1984 | Bartholomew . | |
| 4,615,543 | 10/1986 | Cannon | 285/419 |
| 4,660,862 | 4/1987 | Cassel et al. | 285/114 |
| 4,671,541 | 6/1987 | Webb et al. | 285/419 |
| 4,783,029 | 11/1988 | Geppert et al. . | |
| 4,795,197 | 1/1989 | Kaminski et al. | 285/419 |
| 5,112,085 | 5/1992 | Busch et al. . | |

FOREIGN PATENT DOCUMENTS

| | | |
|---|---|---|
| 28 39 635 | 4/1979 | Germany . |
| 30 47 867 | 9/1982 | Germany . |
| 1-176889 | 7/1989 | Japan . |
| 6-174163 | 6/1994 | Japan . |

*Primary Examiner*—Eric K. Nicholson
*Attorney, Agent, or Firm*—Raymond L. Coppiellie

[57]          ABSTRACT

In a tube connection, an axial end region of a first tube is inserted into an axial end region of a second tube having an internal diameter greater than the external diameter of the first tube. Elastic sealing elements are disposed between the outside of the inserted end region and the inside of the receiving end region. A safety clip which holds the tubes in place in the axial direction is at the same time so formed that misalignment of the tubes in the region of the tube connection is prevented. The safety clip has first and second contact regions, in the form of clamps, which are provided for preferably area contact with the outsides of the end regions of the tubes to be connected. The contact regions each extend over an axial length such that when the safety clip is in the clamped position the tubes are held in the region of the tube connection non-tiltably in a mutually axially aligned position.

5 Claims, 1 Drawing Sheet

TUBE CONNECTION SECURING CLIP

BACKGROUND OF THE INVENTION

1. Field of the Invention

The present invention relates to a tube connection for joining together a pair of fluid couplings. More particularly, the present invention relates to a tube connection having a safety clip fitted thereover to hold the tubes in place in the axial direction.

2. Disclosure Information

Tube connections having safety clips are known from German patent specification 30 47 867. In this known tube connection, the safety clip has a generally U-shaped cross-section and, when fitted over the tubes to be joined, secures the tube connection positively in the axial direction. Tube connections with this kind of safety clip are not suitable for all fields of application. Thus in the case of tube connections in pipelines of air-conditioning systems in motor vehicles the problem arises that connections in pipelines that are fixed at one end to the engine and at the other end to the chassis or frame have to be secured not only in the axial direction against accidental detachment but also against skewing or tilting of the tubes to be connected. However, in the known tube connection the safety clip does not ensure that in the region of the tube connection the tubes are held in axial alignment with one another without tilting or skewing.

It is an object of the present invention to overcome this disadvantage and to provide an improved tube connection of the kind referred to above such that no misalignment or tilting of the tubes occurs when secured together.

SUMMARY OF THE INVENTION

To this end, according to the invention, the safety clip has a first contact region formed as a clamp to fit, in the clamped position, axially non-tiltably against the outside of the receiving end region and a second contact region formed as a clamp to fit, in the clamped position, axially non-tiltably against the outside of the axial region of the first tube adjacent the inserted end region, the contact regions each being of torsion-resistant form and being connected together by a torsion-resistant middle region. Each contact region extends over axial regions formed so that in the clamped position of the safety clip the tubes are held in the region of the tube connection non-tiltably in a mutually axially aligned position. The contact regions are preferably formed for area contact with the corresponding outside tube regions.

This prevents any tilting movement in the region of the tube connection. At the same time the contact region, by extending over a relatively large axial region, effects radial fixing of the two ends of the tubes.

In a further embodiment of the invention axially-extending channels or the like are pressed in the portions of the second contact region provided for area contact with the axial region of the first tube which has a smaller external diameter than the external diameter of the receiving end region. This enables the curvatures of the contact surfaces to be adapted in a simple manner to the different external diameters against which they are to bear, namely by the associated portions of one contact region being bulged out semicircularly and the associated portions of the other contact region having grooves or channels pressed in them, so that matching of the curvatures of this region to the "smaller" external diameter is possible.

BRIEF DESCRIPTION OF THE DRAWINGS

The invention will now be described in more detail with reference to the exemplary embodiment shown diagrammatically in the drawings, in which.

DETAILED DESCRIPTION OF A PREFERRED EMBODIMENT OF THE INVENTION

Figure 1:
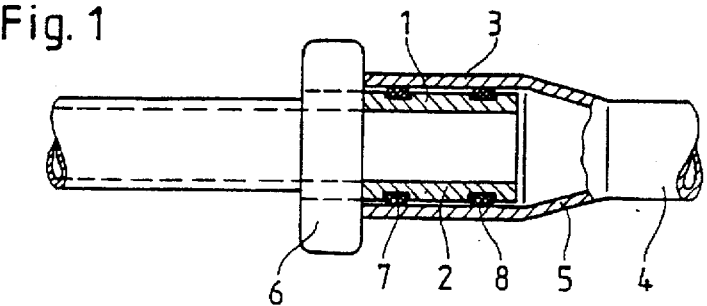
FIG. 1 shows a tube connection without a safety clip.

As shown in FIG. 1, an axial end region 2 of a tube 1 is inserted into an axial end region 3 of a second tube 4. As can be seen, the diameter of the axial end region 3 of the second tube 4 is greater than the normal external diameter of the tube 4 and is joined to the tube 4 by a conical transition region 5. Next to the end region 3 there is an end flange 6. Sealing elements, such as O-rings, 7 and 8 are provided between the outside of the inserted end region 2 and the inside of the receiving end region 3.

Figure 2:
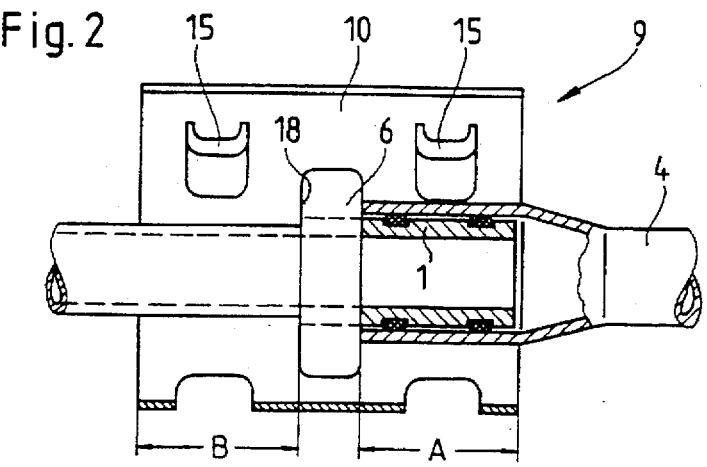
FIG. 2 shows a tube connection with a safety clip according to the invention, partly in section.
Figure 3:
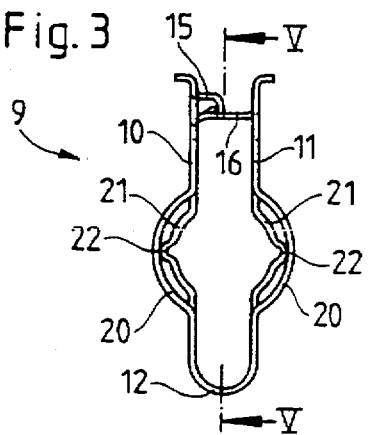
FIG. 3 shows an end elevation of the safety clip with the locking mechanism in the locked position.
Figure 4:
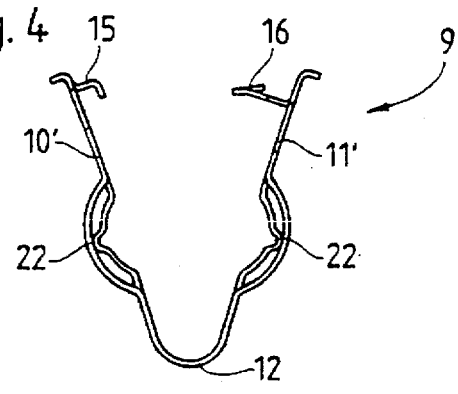
FIG. 4 is an illustration corresponding to FIG. 3, but in the open position, in which the two half-shell elements are pivoted apart from one another.
Figure 5:
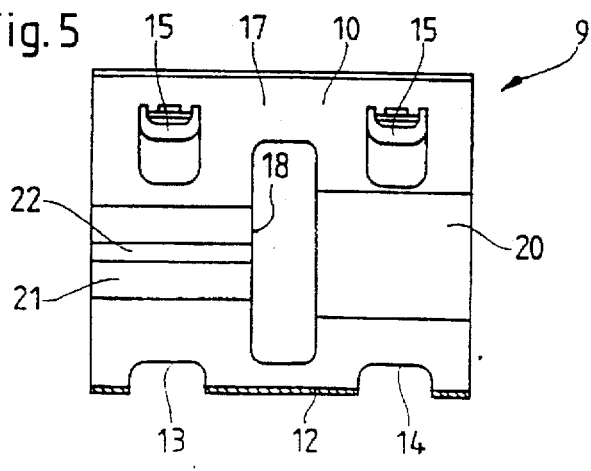
FIG. 5 is a sectional view of the safety clip, taken along the line V—V in FIG. 3.

As FIG. 2 shows, a safety clip indicated generally by 9 extends over the outside of the connection region between the tubes to be joined. In the embodiment shown, the safety clip 9 is formed of spring steel in one piece and comprises two relatively pivotable half-shell elements 10 and 11 joined together at a living hinge formed by connecting region 12. The connecting region 12 includes recesses 13 and 14 (FIG. 5). The recesses 13, 14 facilitate and improve the pivotability of the two half-shell elements. (In the open position shown in FIG. 4 the half-shell elements are designated 10' and 11'.) When clamped, the two half-shells 10, 11 are held together against their spring pre-tension by means of a locking mechanism. The locking mechanism comprises mutually engaging locking lugs 15 and 16.

Each of the half-shell elements 10 and 11 further includes a first contact region 20 and a second contact region 21. The first contact region 20 extends in the axial direction over a region A (FIG. 2) and the second contact region 21 extends in the axial direction over a region B (FIG. 2). The second contact region 21 has groove-like depressions 22 formed in each of its portions. The groove like depressions 22 are provided to firmly engage the smaller diameter end of the first tube 1, so that despite the one-piece construction of the safety clip 9, contact between the first contact region 20 and the second contact region 21 respectively with the tube end region and the tube 1 is possible.

Each half-shell element 10, 11 also includes a middle region 17, having openings 18. The openings 18 are formed such that in the clamped position they receive the end flange 6 of the end region 3 of the tube 4 and thereby secure it positively in the axial direction. The middle region 17 and the contact regions 20 and 21 are formed so as to be torsion-resistant.

In the clamped position, with the locking mechanism engaged, the contact regions 20 and 21 of the safety clip 9 surround and are in area contact with the axial regions A and B of the tube ends to be connected (FIG. 2). The contact regions 20, 21 hold axial regions A and B in a mutually axially aligned position so that they cannot come askew and cannot tilt with respect to one another. As such, securing against torsion is simultaneously achieved. In addition, by the fact that the end flange 6 bears on the edges of the recess 18, the tube connection is secured in the axial direction.

The one-piece safety clip can be protected from corrosion by chromatising and be provided with locking lugs which ensure secure closure of the safety clip. On safety grounds the safety clip can only be opened by means of a special tool.

Various other modifications will no doubt become apparent to those skilled in the art. It is the following claims, including all equivalents which define the scope of the invention.

What is claimed is:

1. A clip for securing together a pair of overlapping tube ends in which an axial end of a first tube is inserted into an axial end of a second tube, the first tube including a flange member spaced a predetermined distance from a terminal edge of the first tube, the clip comprising:

a pair of generally arcuate, elongate elements formed integrally as a one piece member connected together by a living hinge and being pivotable from a first open position to a second clamped position, each of the elements including:

a first contact region adapted to contact said axial end of the second tube over a predetermined area;

a second contact region adapted to contact the exterior of said first tube opposite said flange member over a predetermined area, said second contact member having grooved depressions formed therein, said second contact region being operable to firmly engage the exterior of the first tube when said clip is in the clamped position;

the first and second contact regions being operable to secure the tube ends in mutually axially aligned, non-tiltable positions when the clip is in the clamped position; and a middle region including an opening configured to matingly engage said flange member when said clip is in said clamped position, said opening comprising an aperture formed between said first and second contact regions and configured to positively retain said flange member therein to prevent axial displacement of said clip; and a locking mechanism for securing the pair elements together in the clamped position.

2. A clip as claimed in claim 1, wherein the first and second contact regions are formed to be torsion resistant.

3. A clip as claimed in claim 1, wherein the middle region is formed to be torsion resistant.

4. A clip as claimed in claim 1, wherein the relatively pivotable elements are formed as a one-piece unit from a spring steel.

5. A clip as claimed in claim 1, wherein the locking mechanism includes a pair of mutually engageable locking lugs.

* * * * *